US008310707B2

(12) United States Patent
Nakaso

(10) Patent No.: US 8,310,707 B2
(45) Date of Patent: Nov. 13, 2012

(54) IMAGE FORMING DEVICE, IMAGE FORMING SYSTEM AND IMAGE FORMING METHOD FOR IMAGE WITH HIGH-DENSITY AREA

(75) Inventor: Koji Nakaso, Tokyo (JP)

(73) Assignee: Oki Data Corporation, Tokyo (JP)

( * ) Notice: Subject to any disclaimer, the term of this patent is extended or adjusted under 35 U.S.C. 154(b) by 499 days.

(21) Appl. No.: 12/585,766

(22) Filed: Sep. 24, 2009

(65) Prior Publication Data

US 2010/0079806 A1 Apr. 1, 2010

(30) Foreign Application Priority Data

Sep. 29, 2008 (JP) ................................ 2008-250733

(51) Int. Cl.
*G06F 15/00* (2006.01)

(52) U.S. Cl. ...................................................... 358/1.15

(58) Field of Classification Search .................. 358/1.15
See application file for complete search history.

(56) References Cited

U.S. PATENT DOCUMENTS

2004/0125389 A1 * 7/2004 Tokura et al. .................. 358/1.9
2004/0184079 A1 * 9/2004 Sakamoto .................... 358/1.15

FOREIGN PATENT DOCUMENTS

JP A-2000-118007 4/2000
JP A-2004-294575 10/2004

OTHER PUBLICATIONS

Machine translation for JP 2004-294575, IDS.*
Office Action mailed on Mar. 16, 2011 issued in the Corresponding Japanese Patent Application No. 2008-250733.

* cited by examiner

*Primary Examiner* — Benny Q Tieu
*Assistant Examiner* — Qian Yang
(74) *Attorney, Agent, or Firm* — Posz Law Group, PLC

(57) ABSTRACT

An image forming device includes an image forming unit in communication with a printing data memory unit and configured to print first and second printing data on a front side of a recording medium, and a recording medium re-feeding mechanism unit configured to re-feed the recording medium to the image forming unit to enable the image forming unit to over-print one of the first printing data and the second printing data on the front side of the recording medium at the image forming unit.

24 Claims, 9 Drawing Sheets

IMAGE FORMING DEVICE, IMAGE FORMING SYSTEM AND IMAGE FORMING METHOD FOR IMAGE WITH HIGH-DENSITY AREA

CROSS REFERENCE TO RELATED APPLICATION

The present application is related to, claims priority from and incorporates by reference Japanese Patent Application No. JP2008-250733, filed on Sep. 29, 2008.

TECHNICAL FIELD

The present invention relates to an image forming device, an image forming system and an image forming method that are capable of high-density printing.

DESCRIPTION OF RELATED ART

Conventionally, in a solid image that is formed on a recording medium by an image forming device, undesired white spots and color shading tend to occur. High-density printing is a common method used to prevent such white spots and color shading. A method to increase an ink injecting amount using a head that has a variable ink injection amount in order to perform high-density printing is described in Japanese laid-open patent publication No. JP2000-118007. On the other hand, with an electrographic type printer, not with an inkjet type printer, it is possible to increase the printing density to a certain degree by changing a process condition such as "increased exposure amount," "increased developer voltage" or "increased transferring voltage" for increasing the transferring amount of toner in order to perform high-density printing.

However, with the method described in the aforementioned patent reference 1, the consumption of ink increases as the high-density printing is performed on areas other than the solid areas. Therefore, this causes a waste of resources. Moreover, with the electrographic type printer, the scale of the required power circuit increases because process conditions change, causing a cost increase. Also, when the image is formed on a recording medium using toner, it has been difficult to realize high-density printing because there are limitations to the thickness of the toner layer that is formed on an image carrier, and to the transfer amount of toner.

The present invention comprises the following structures to overcome the aforementioned problems.

An image forming device of the present invention includes a recording medium feeding mechanism unit configured to feed a recording medium for printing, the recording medium including a front side and a back side; a data receiving unit configured to receive image data including a high-density printing order; a judging unit in communication with the data receiving unit and configured to judge whether or not to perform high-density printing based on the image data received from the data receiving unit; a specified area extracting unit in communication with the judging unit and configured to extract a specified area from the image data when the judging unit judges that the high-density printing should be performed; a printing data creating unit in communication with the specified area extracting unit and configured to create first printing data obtained from the specified area extracted by the specified area extracting unit and second printing data obtained from the image data; a printing data memory unit in communication with the printing data creating unit and configured to store the first printing data and the second printing data created at the printing data creating unit; an image forming unit in communication with the printing data memory unit and configured to print the stored first printing data and the stored second printing data on a front side of the recording medium; and a recording medium re-feeding mechanism unit configured to re-feed the recording medium to the image forming unit to enable the image forming unit to over-print one of the first printing data and the second printing data on the front side of the recording medium at the image forming unit.

Also, an image forming system of the present invention includes a recording medium feeding mechanism unit configured to feed a recording medium for printing, the recording medium including a front side and a back side, a host device including a specified area designating unit configured to designate a specified area for high-density printing, a driver configured to create specified area information from the specified area of the image data that is designated by the specified designating unit, and a data transmitting unit configured to transmit the image data and the specified area information; and an image forming device including a data receiving unit configured to receive the image data, including a high-density printing order, from the data transmitting unit of the host device, a judging unit configured to judge whether or not high-density printing should be performed based on the image data and the specified area information received at the data receiving unit, a specified area extracting unit configured to extract a specified area from the image data when the judging unit judges that the high-density printing should be performed, a printing data creating unit configured to create first printing data that is obtained from the specified area extracted at the specified area extracting unit and second printing data that is obtained from the image data, a printing data memory unit for storing the first printing data and the second printing data created at the printing data creating unit, an image forming unit for printing using the first printing data and the second printing data that are stored in the printing data memory unit, and a recording medium re-feeding mechanism unit configured to re-feed the recording medium to the image forming unit for over-printing one of the first printing data and the second printing data on the front side of the recording medium.

According to the present invention, it is possible to perform high-density printing without changing a process condition such as increasing the scale of a power circuit by performing over-printing, also referred to as high-density printing, to the solid area designated by the user.

DETAILED DESCRIPTION

An embodiment of the present application is explained below. The present invention is explained using a single pass method electro-photographic color printer (hereafter printer) as an image-forming device. The single pass method electro-photographic color printer is an electro-photographic color printer that uses a printing engine method by arranging the developing devices of yellow, magenta, cyan and black colors in a carrying direction of a printing medium, and performs, or executes, development of a toner image in a single process.

First Embodiment

Figure 2:
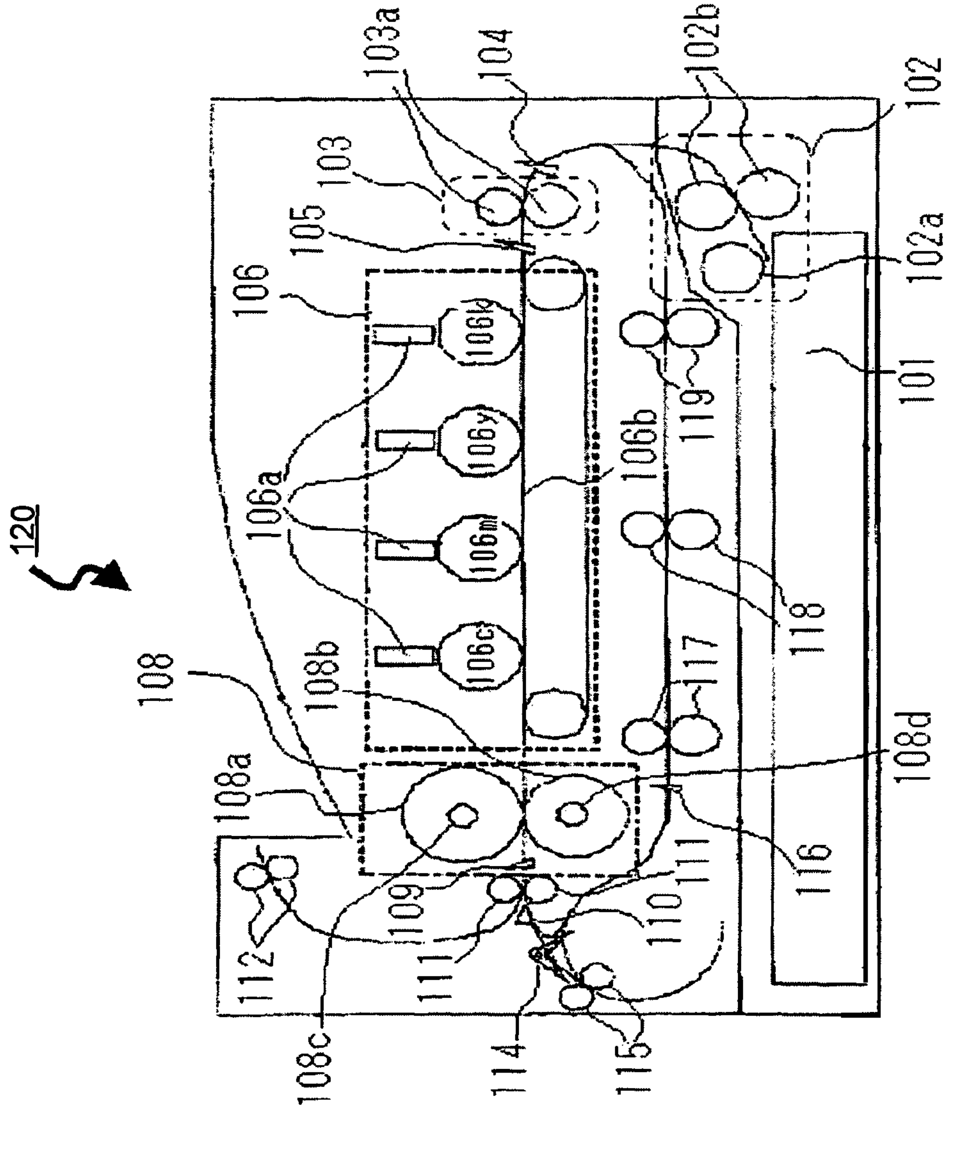
FIG. 2 is a cross sectional view showing a mechanical structure of a printer according to the first disclosed embodiment.

FIG. 2 is a cross sectional view showing a mechanical structure of the printer according to a first disclosed embodiment. In this figure, a printer 120 has a recording medium feeding tray 101, a recording medium feeding unit 102, a carrying unit 103, a recording medium feeding detecting unit 104, a recording medium edge detecting unit 105, an image forming unit 106, a fusing unit 108, a fusing detecting unit 109, an ejecting carrying path switching unit 110, a fusing carrying unit 111, an ejecting carrying unit 112, a recording medium (RM) re-feeding mechanism controlling unit 113, a recording medium (RM) re-feeding carrying path switching unit 114, an invert carrying unit 115, a recording medium re-feeding detecting unit 116 and recording medium re-feeding carrying units 117, 118 and 119.

The recording medium feeding tray 101 contains a recording medium, such as, for example, paper or a sheet. The recording medium feeding unit 102 (or recording medium feeding mechanism unit) includes a pick-up roller 102*a* that separates and retrieves one recording medium from others (sheet by sheet) from the recording medium feeding tray 101 and carrying rollers 102*b* that are disposed to contact and to sandwich the recording medium and carry it to the recording medium feeding detecting unit 104.

The carrying unit 103 includes carrying rollers 103*a* that are disposed to contact each other and to sandwich a recording medium and carry it to the recording medium edge detecting unit 105.

The recording medium feeding detecting unit 104 is a sensor to detect whether or not the recording medium is being carried by the carrying rollers 102*b*. The recording medium edge detecting unit 105 is a sensor to detect whether or not the edge of the recording medium reaches a predetermined position while being carried to the image forming unit 106.

The image forming unit 106 includes image carriers 106*k*, 106*y*, 106*m* and 106*c* for forming images, a light emitting diode (LED) head 106*a* that is arranged as an exposure means for exposing the image carriers 106*k*, 106*y*, 106*m* and 106*c* and a transfer belt unit 106*b* for transferring a toner image formed on the image carriers 106*k*, 106*y*, 106*m* and 106*c* to the recording medium. Here, the above structure is more particularly described. When the LED heads 106*a* illuminate the image carriers 106*k*, 106*y*, 106*m* and 106*c*, electrostatic latent images are formed on the image carriers 106*k*, 106*y*, 106*m* and 106*c*. The developer voltage operates in a direction toward the electrostatic latent image, then charged toner moves and is attached to the latent image, resulting in forming the toner images. The LED head 106*a* is configured to illuminate the image carriers 106*k*, 106*y*, 106*m* and 106*c* with a predetermined exposure amount that is calculated based on print data. The transfer belt unit 106*b* is configured to be charged with a predetermined transferring voltage so that the charged toner image is conveyed from the image carriers 106*k*, 106*y*, 106*m* and 106*c*.

The fusing unit 108 is to heat-fuse a toner image transferred to a recording medium. The fusing unit 108 includes a pair of rollers 108*a* and 108*b* that contact one another with a predetermined contacting pressure, and a pair of halogen lamps 108*c* and 108*d* are respectively stored in the rollers 108*a* and 108*b* to heat the recording medium. The fusing detecting unit 109 is a sensor to detect passage of the recording medium on which the toner image is heat-fused by the fusing unit 108.

The ejecting carrying path switching unit 110 is a guide member to eject the recording medium outside of the printer or to switch the carrying path for re-feeding the recording medium.

The fusing carrying unit 111 is a pair of rollers that carry the recording medium on the ejecting carrying path switching unit 110. The ejecting carrying unit 112 is a pair of rollers that ejects the recording medium on which printing is completed outside of the printer.

The recording medium re-feeding carrying path switching unit 114 operates as a guide to selectively carry the recording medium for re-feeding to either a carrying path A or to a carrying path B that are described later. The invert carrying unit 115 is made of a pair of rollers and inverts the re-fed recording medium.

Figure 3A:
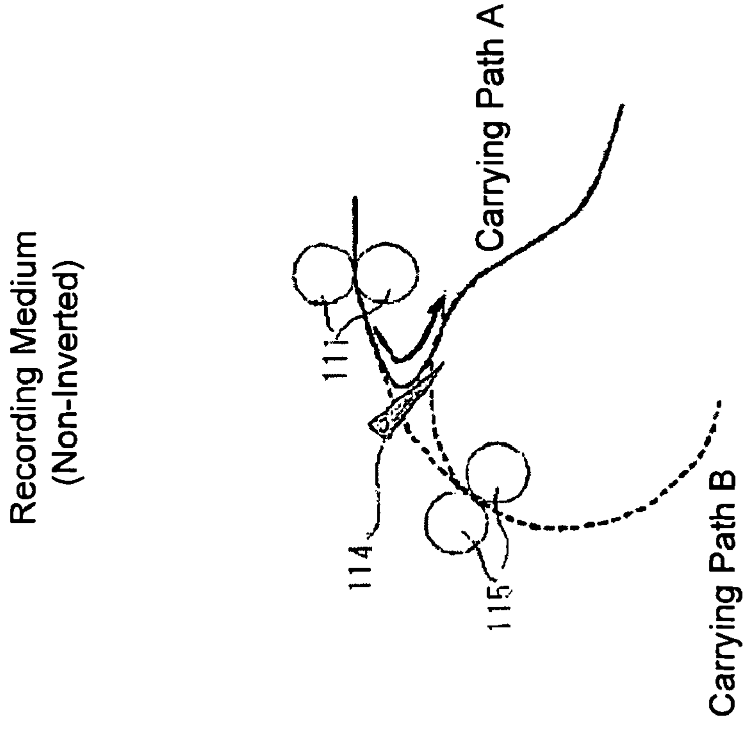
FIGS. 3A and 3B are explanatory diagrams concerning switching of the carrying path when re-feeding the recording medium according to the first disclosed embodiment.
Figure 3B:
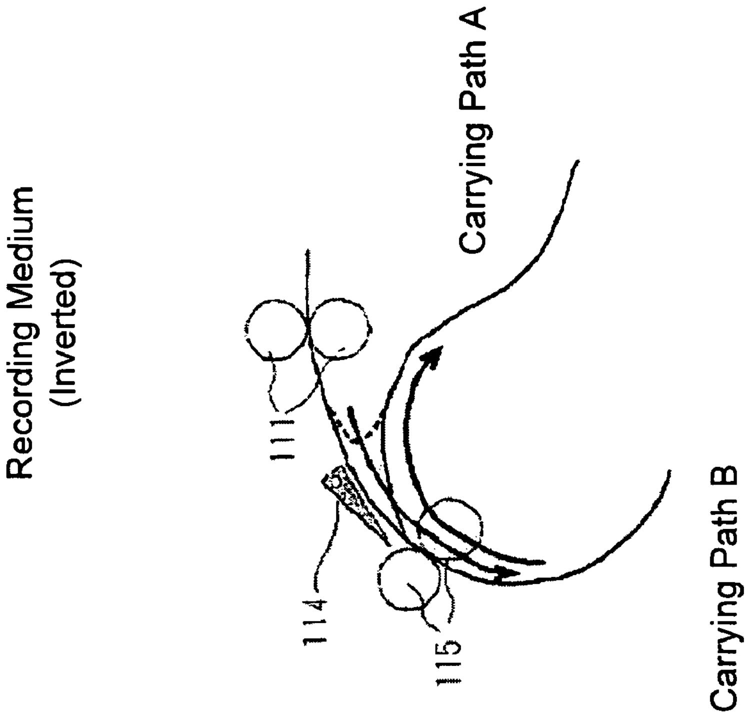

Hereafter, switching of the carrying path for re-feeding the recording medium is explained. FIGS. 3A and 3B are explanatory diagrams concerning switching of the carrying path for re-feeding the recording medium according to the first embodiment. FIG. 3A is an explanatory diagram of the recording medium being non-inverted. When the recording medium is not inverted, the recording medium is carried to the carrying path A without being inverted by the fusing carrying unit 111, and by swinging the recording medium re-feeding carrying path switching unit 114 to the carrying path A side shown in the figure. Accordingly, an over-printing, or high-density printing, is performed, or executed, on re-feeding the recording medium that was carried to the carrying path A.

On the other hand, FIG. 3B is an explanatory diagram of the recording medium being inverted. The recording medium is carried to the invert carrying unit 115 and further to the carrying path B by swinging the recording medium re-feeding carrying path switching unit 114 from the carrying path A side to the carrying path B side shown in the figure. When the trailing edge of the recording medium reaches the invert carrying unit 115, the invert carrying unit 115 is reversely swung in order to carry the recording medium to the carrying path A. With switching positions of the recording medium re-feeding carrying path switching unit 114, the recording medium is carried to the carrying path A from the carrying path B. Accordingly, the recording medium is carried to the carrying path A with the condition that the recording medium is inverted and its leading and trailing edges are switched. The back side of the recording medium is printed when the recording medium that was carried to the carrying path A is inverted and re-fed. Accordingly, double-sided printing is executed.

Returning to FIG. 2, the explanation is continued. The recording medium re-feeding detecting unit 116 is a sensor to detect that the recording medium is being carried to the carrying path for re-feeding. The recording medium for re-feeding is carried to the carrying unit 103 by the recording medium re-feeding carrying units 117, 118 and 119 that are shown in the figure.

Figure 1:
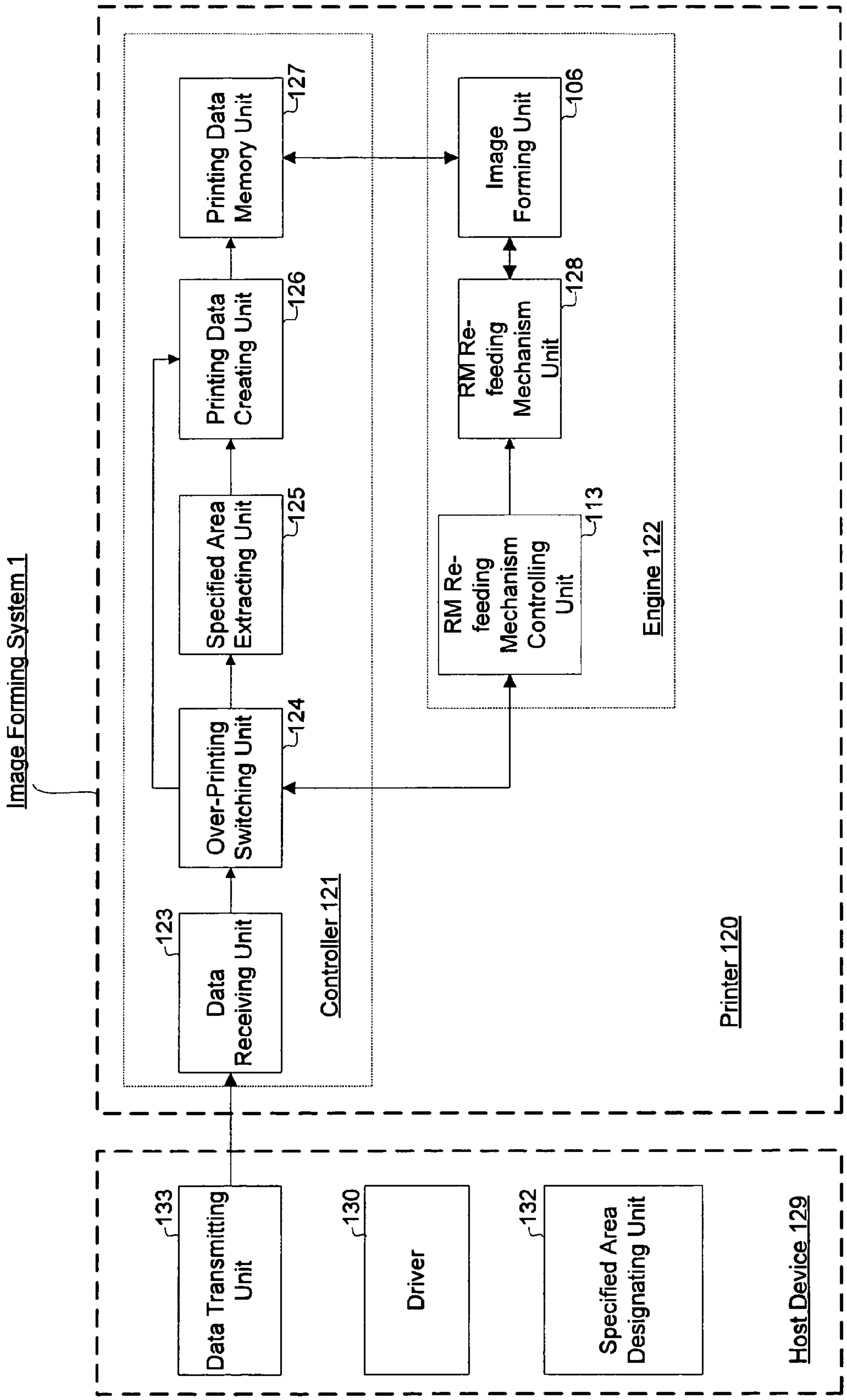
FIG. 1 is a functional block diagram of an image forming system according to a first disclosed embodiment.

Next, the function block for over-printing of the image forming system 1 according to the first embodiment is explained. FIG. 1 is a functional block diagram of the image forming system according to the first embodiment.

The image forming system 1 includes a host device 129 and a printer 120. The printer 120 has a controller 121 and an engine 122. The controller 121 includes a data receiving unit 123, an over-printing switching unit 124 (or a judging unit), a specified area extracting unit 125, a printing data creating unit 126 and a printing data memory unit 127.

The data receiving unit 123 receives various data, such as, for example image data, from the host device 129. The over-printing switching unit 124 judges whether or not to execute over-printing or normal printing based on receipt or non receipt of the over-printing order, or information, that is included with the image data received through the data receiving unit 123.

The specified area extracting unit 125 receives image data from the over-printing switching unit 124 when the over-printing switching unit 124 judges that over-printing order was sent by the over-printing switching unit 124. The specified area extracting unit 125 generates only the image data of a specified area based on the specified area information that is included with the conveyed image data.

The printing data creating unit 126 creates (or generates) the first printing data that is made of dot data such as bit map data from the image data that only has the specified area generated at the specified area extracting unit 125, and creates (or generates) the second print data that is made of the dot data such as bit map data from the image data that is conveyed from the over-printing switching unit 124. The printing data memory unit 127 memorizes, or stores, the printing data created (or generated) at the printing data creating unit 126.

The engine 122 includes the image forming unit 106, a recording medium re-feeding mechanism unit 128 and a recording medium re-feeding mechanism controlling unit 113. The image forming unit 106 reads the print data stored in the print data memory unit 127 and prints the data on the recording medium. The recording medium re-feeding mechanism unit 128 includes the recording medium re-feeding carrying path switching unit 114, the invert carrying unit 115, the recording medium re-feeding detecting unit 116 and the recording medium re-feeding carrying units 117, 118 and 119. The recording medium re-feeding mechanism controlling unit 113 controls whether or not to re-feed the recording medium without inverting it or re-feed the recording medium with inverting it by controlling the recording medium re-feeding carrying path switching unit 114.

Still referring to FIG. 1, the host device 129 includes a driver 130, a specified area designating unit 132 and a data transmitting unit 133. The driver 130 is software that is implemented on an operating system (OS) and that generates image data. Moreover, the driver 130 generates the over-printing information and the specified area information: the over-printing information including the over-printing order for the image data by the high-density printing order from the user, the specified area information being composed of coordinate data that shows a range for performing the over-printing that is designated by the specified area designating unit 132, which is described later. Moreover, when the driver 130 receives an order from the user to print on both sides, it generates the double-sided printing information in the image data. The driver 130 applies the over-printing information, the specified area information and the double-sided printing information generated for the image data.

The specified area designating unit 132 is software that is implemented on the driver 130, and that designates the specified area showing the range for performing the over-printing designated by the user.

The data transmitting unit 133 transmits the image data to the printer 120. The over-printing information and the specified area information generated at the driver 130 are applied to the image data.

Figure 4:
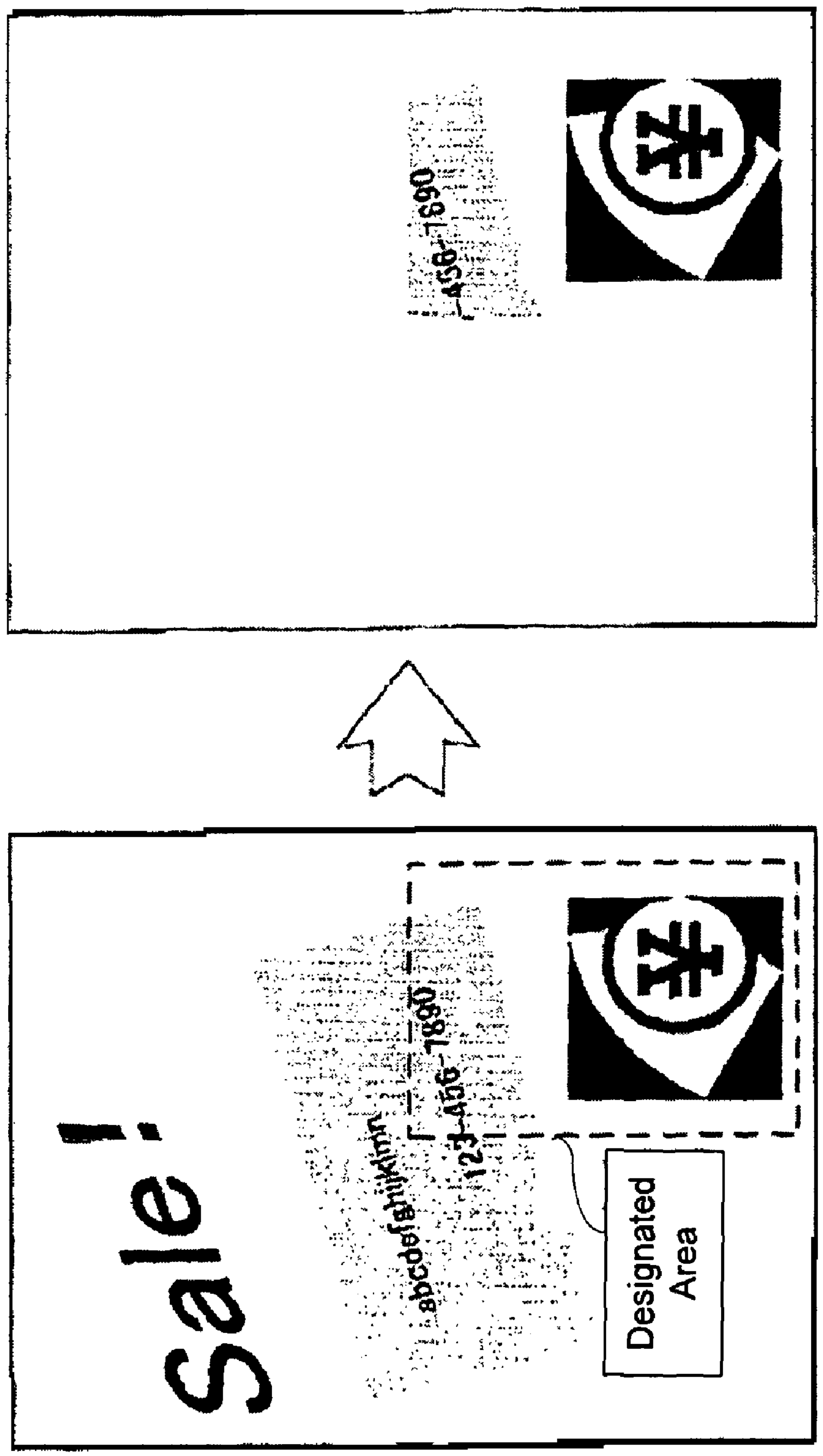
FIG. 4 is an explanatory diagram concerning an image for over-printing that is generated by selecting a specified area of an image according to the first disclosed embodiment.

Hereafter, extraction of a specified area according to the first embodiment is explained using the figures. FIG. 4 is an explanatory diagram concerning an image for over-printing that is generated by selecting a specified area of an image according to the first embodiment.

As shown in the figure, the image for over-printing is determined by the user to designate the range including the solid area on the right bottom of the image from the specified area designating unit 132 of the host device 129.

Figure 5:
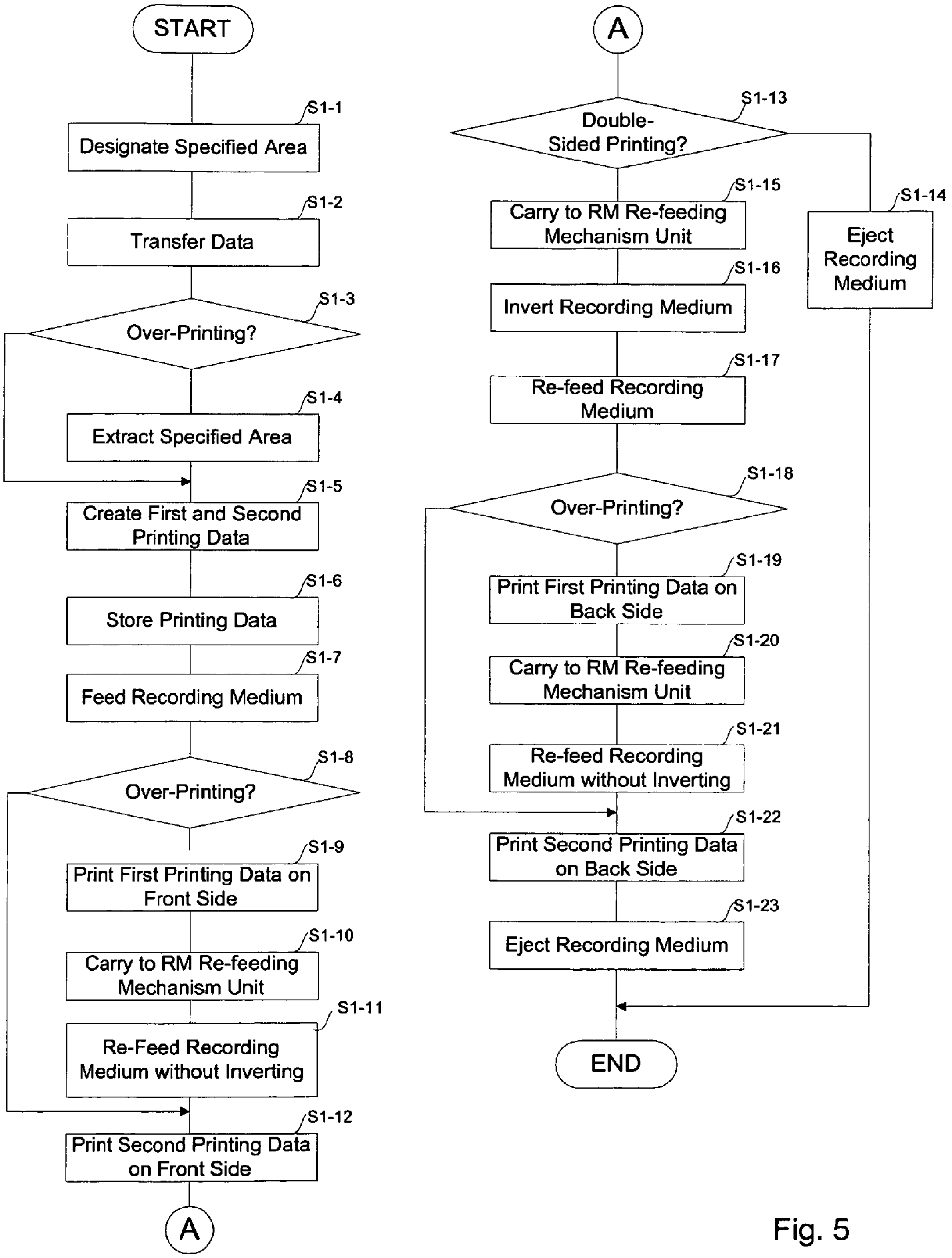
FIG. 5 is a flow diagram showing a flow of processing of over-printing of an image forming system according to the first disclosed embodiment.

Next, the over-printing of the image forming system according to the first embodiment is explained. FIG. 5 is a flow chart showing a flow of processing of over-printing of the image forming system according to the first embodiment. Hereafter, the operation from S1-1 through S1-23 of the image forming system 1 is explained with reference to FIG. 1.

(S1-1) The user selects an order for high-density printing (over-printing information), an order for designating an specified area by the specified area designating unit 132 (specified area information), and an order for double-sided printing (double-sided printing information) from the screen of the host device 129, then inputs an order for starting printing, when transmitting the printing order to the printer 120 through application programs of the host device 129.

(S1-2) The driver 130 of the host device generates image data that includes the order for high-density printing, the designation of the range when performing high-density printing, and the order for double-sided printing, and transmits this data to the data receiving unit 123 of the printer 120 through the data transmitting unit 133.

(S1-3) The over-printing switching unit 124 that receives the image data through the data receiving unit 123 confirms the over-printing information applied to the image data in order to judge whether or not to execute over-printing. If the information includes an order for over-printing, processing proceeds to S1-4; if the information does not include an order for over-printing, processing proceeds to S1-5.

(S1-4) When the information applied to the image data includes the order for over-printing, the over-printing switching unit 124 conveys the received image data to the specified area extracting unit 125. The specified area extracting unit 125 receives the image data and extracts the specified area information from the coordinate data, and generates the image data only for the range for performing over-printing within the image data.

(S1-5) After the specified area extracting unit 125 generates the image data only for the range of performing the over-printing, in other words, the image data of the specified area, it conveys the image data to the printing data creating unit 126. The printing data creating unit 126 creates (or generates) the first printing data from the image data of the specified area. Moreover, the printing data creating unit 126 obtains the image data of first page from the over-printing switching unit 124 and generates the second printing data.

(S1-6) The printing data creating unit 126 stores the first printing data and the second printing data in the printing data memory unit 127 when the first printing data and the second printing data are created (or generated).

(S1-7) When the first printing data and the second printing data are stored in the printing data memory unit 127, the image-forming unit 106 feeds the recording medium.

(S1-8) During the feeding and printing of the recording medium, the following processing is determined based on the result of the judgment processing at S1-3 (whether or not over-printing is performed). When over-printing is performed, processing proceeds to S1-9, when over-printing is not performed, processing proceeds to S1-12.

(S1-9) When over-printing is performed, the image forming unit 106 reads the first printing data that shows the specified area from the printing data memory unit 127 and performs printing on the front side of the recording medium.

(S1-10) When printing of the first printing data on the front (top) side of the recording medium is completed, the recording medium re-feeding mechanism controlling unit 113 controls the ejecting carrying path switching unit 110 and the fusing carrying unit 111, in order not to eject the recording medium, and to carry the recording medium to the recording medium re-feeding mechanism unit 128.

(S1-11) Next, the recording medium re-feeding mechanism controlling unit 113 switches the recording medium re-feeding carrying path switching unit 114 to the carrying path A side as shown in FIG. 3A in order to perform printing of the second printing data that includes the entire image area on the front side of the recording medium, and re-feeds the recording medium to the image forming unit 106 without inverting the recording medium.

(S1-12) Next, the image forming unit 106 reads the second printing data from the printing memory unit 127, and performs printing of the second printing data on the front side of the recording medium. When the printing is completed, it proceeds to S1-13.

(S1-13) Next, the over-printing switching unit 124 judges whether or not the received image data includes double-sided printing information. If double-sided printing information is included, processing proceeds to S1-15; if not, processing proceeds to S1-14.

(S1-14) If double-sided printing is not to be performed, the recording medium re-feeding mechanism controlling unit 113 controls the ejecting carrying path switching unit 110, the fusing carrying unit 111 and the ejecting carrying unit 112 in order to eject the recording medium, and ejects the recording medium and completes the printing.

(S1-15) On the other hand, if is the double-sided printing is to be performed, the recording medium re-feeding mechanism controlling unit 113 carries the recording medium to the recording medium re-feeding mechanism unit 128 without ejecting the recording medium by controlling the ejecting carrying path switching unit 110 and the fusing carrying unit 111.

(S1-16) Next, the recording medium re-feeding mechanism controlling unit 113 switches the recording medium re-feeding carrying path switching unit 114 to the carrying path B side as shown in FIG. 3B in order to carry the recording medium to the invert carrying unit 115 to invert the recording medium so that the back side of the recording medium is printed.

(S1-17) The recording medium re-feeding mechanism controlling unit 113 then carries the recording medium to the invert carrying unit 115 and carries the recording medium to the carrying path B. When the trailing edge of the recording medium reaches the invert carrying unit 115, the recording medium re-feeding mechanism controlling unit 113 reverses the direction of rotation of the invert carrying unit 115 in order to carry the recording medium to the carrying path A, and carries the recording medium to the carrying path A from the carrying path B. Accordingly, the recording medium is inverted, and is carried to the carrying path A with an orientation where the leading and trailing edges of the recording medium are switched. In other words, the back side of the recording medium becomes the front side when it runs through printing processing. The recording medium re-feeding mechanism controlling unit 113 then re-feeds the recording medium that was carried to the carrying path A.

(S1-18) When feeding and printing the recording medium, processing is determined based on the judgment result at S1-3. When over-printing is performed, processing proceeds to S1-19; when over-printing is not performed, processing proceeds to S1-22.

(S1-19) Next, the image forming unit 106 reads the first printing data that shows the specified area of the back side of the image data from the printing data memory unit 127, and prints on the back side of the recording medium.

(S1-20) When printing on the back side of the recording medium is completed, the recording medium re-feeding mechanism controlling unit 113 carries the recording medium to the recording medium re-feeding mechanism unit 128 without ejecting the recording medium by controlling the ejecting carrying path switching unit 110 and the fusing carrying unit 111.

(S1-21) The recording medium re-feeding mechanism controlling unit 113 then switches the recording medium re-feeding carrying path switching unit 114 to the carrying path A side as shown in FIG. 3A in order to further print on the back side of the recording medium, and re-feeds the recording medium to the image forming unit 106 without inverting the recording medium.

(S1-22) Next, the image forming unit 106 reads the second printing data that shows the entire image area of image data of the back side from the printing memory unit 127, and performs printing of the second printing data of image data on the back side of the recording medium where the specified area is already printed, and completes double-sided printing on the recording medium.

(S1-23) When the double-sided printing is completed, the recording medium re-feeding mechanism controlling unit 113 carries the recording medium to the outside of the device by controlling the ejecting carrying path switching unit 110, the fusing carrying unit 111 and the ejecting carrying unit 112 in order to eject the recording medium.

According to the first embodiment, the first printing data is printed first as priority data in the specified area than the second printing data that shows the entire image. However, it is also acceptable modify the embodiment to reverse the first printing data and the second printing data. However, with the present embodiment, the first printing data is printed first. The shrinkage of the recording medium is kept small and the fixing of toner is quicker because the initial amount of toner transferred to the recording medium is small for the first printing data.

Moreover, according to the first embodiment, in order to realize the over-printing, a structure is added to a conventional double-sided printing mechanism; however, it is possible to realize the over-printing by performing the inverting process twice at the time of double-sided printing without adding additional structure.

According to the first embodiment, it is possible to perform high-density printing without changing the process condition by performing the over-printing with respect to the specified area that is designated by the user. The process condition may include, for example, increased exposure amount, increased developer voltage or increased transferring voltage.

Second Embodiment

According to the second embodiment, when executing the over-printing of the specified area, the user may preset the condition to perform the high-density printing. The area to be over-printed is then automatically extracted, and the over-printing is performed.

Hereafter, the portions that are different than the first embodiment are explained in detail. The mechanical structure is the same as the first embodiment, and therefore is omitted. Moreover, the explanations of the function blocks that are the same as the first embodiment are omitted.

Figure 6:
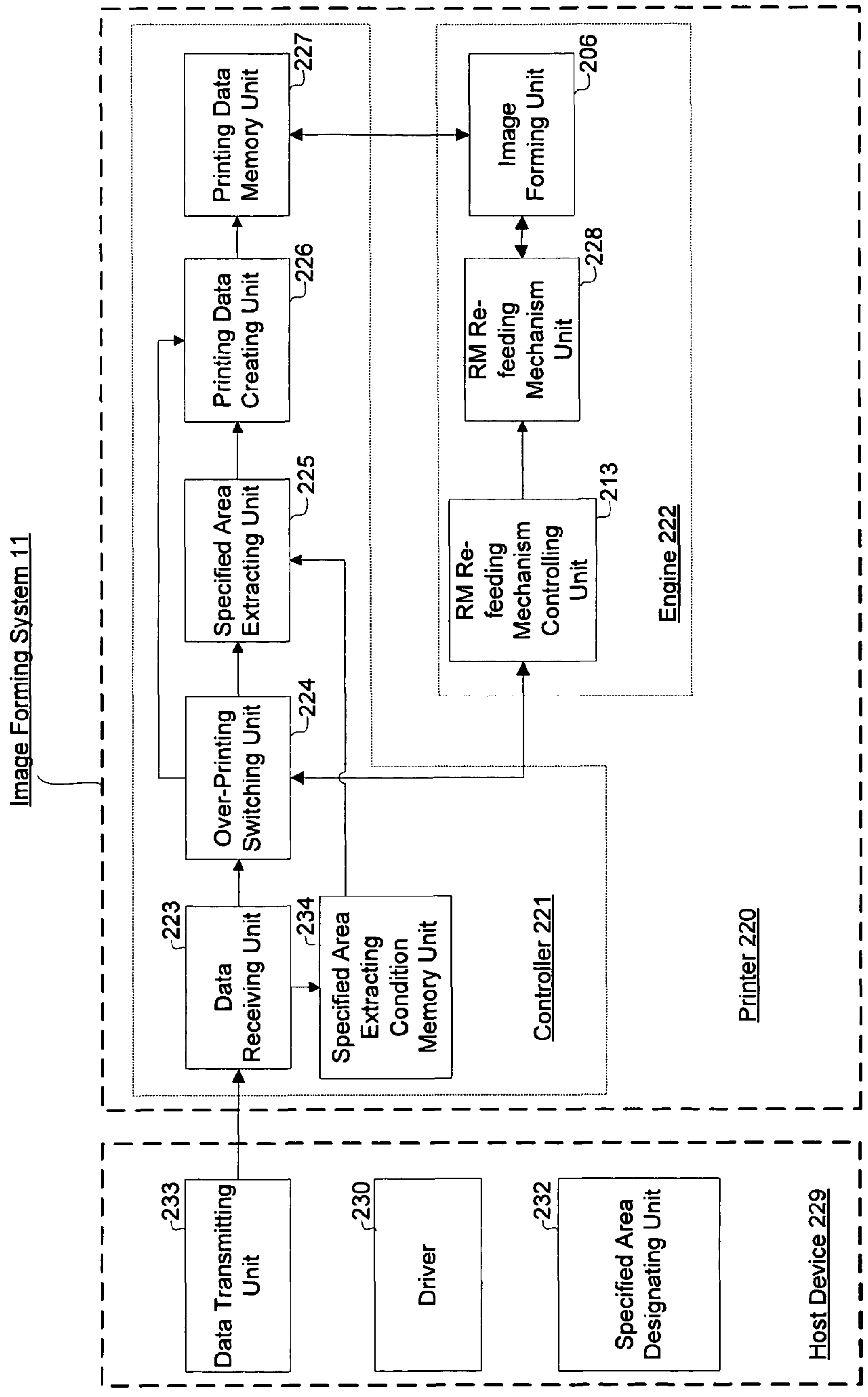
FIG. 6 is a functional block diagram of an image forming system according to a second disclosed embodiment.

FIG. 6 is a functional block diagram of the image forming system of the second embodiment. The image forming system 11 shown in the figure includes a host device 229 and a printer 220. The printer 220 has a controller 221 and an engine 222. The controller 221 includes a data receiving unit 223, an over-printing switching unit 224, a specified area extracting unit 225, a printing data creating unit 226 and a printing data memory unit 227. According to the second embodiment, it also has a specified area extracting condition memory unit 234.

The specified area extracting condition memory unit 234 stores the specified area extracting condition that is pre-defined by the specified-area designating unit 231 of the host device 229. The specified area extracting condition includes three color elements that are expressed as color, color chromaticity and brightness, attribute format (JPEG, BMP or the like) of an image such as logo and image occupying ratio of solid area or the like.

Figure 7:
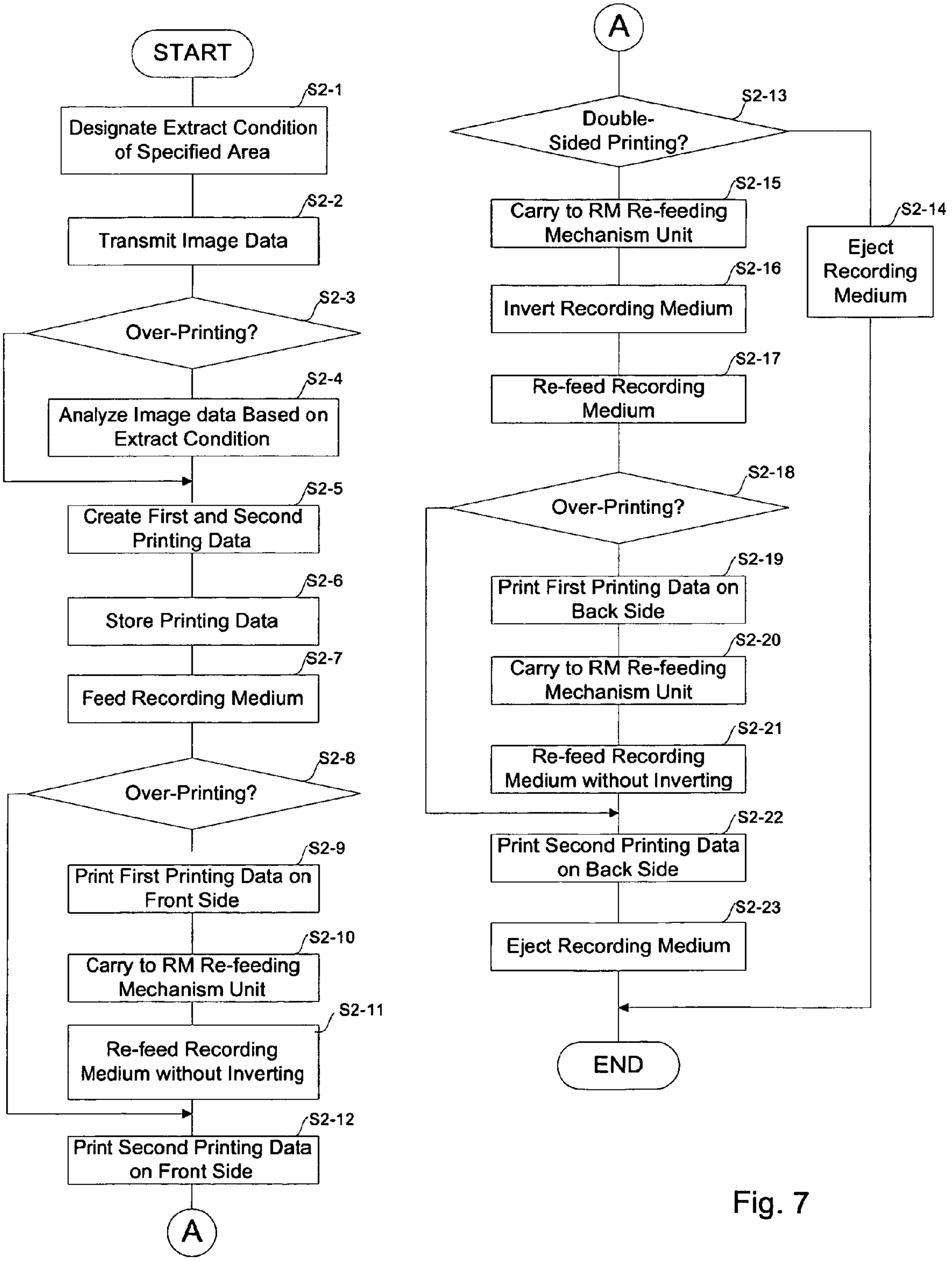
FIG. 7 is a flow diagram showing a flow of processing of over-printing of an image forming system according to the second disclosed embodiment.

Next, the operation of the image forming system according to the second embodiment is explained. FIG. 7 is a flow chart showing a flow of the processing of over-printing of the image forming system according to the second embodiment. Hereafter, each step of the operation of the image forming system 11 according to the second embodiment is explained using FIG. 6. Explanations of the steps from S2-5 to S2-23 are omitted because they are the same as S1-5 to S1-23 of the first embodiment.

(S2-1) The user designates in advance an extract condition of the specified area when performing the over-printing (for example, perform over-printing of a solid area of black color printing) from the driver 230 of the host device 229 before transmitting the printing order to the printer 120 through the application program of the host device 229, and transmits the extract condition to the printer 220 thorough the data transmitting unit 233. The printer 220 stores the received extract condition of the specified area in the specified area extract condition memory unit 234. Next, the user selects the order for high-density printing (over-printing information) and the order for double-sided printing (double-sided printing information) from the screen of the host device 229 and inputs an order to start printing.

(S2-2) The driver 230 of the host device 229 generates the image data that includes the high-density printing order (or over-printing order) and the double-sided printing order, and transmits the data to the data receiving unit 223 of the printer 220 though the data transmitting unit 233.

(S2-3) The over-printing switch unit 224 of the printer 220 that receives the image data through the data receiving unit 223 of the printer 220 confirms the over-printing information that is applied to the image data to judge whether or not to execute the over-printing. If the over-printing information is included with the image data, processing proceeds to S2-4; if the over-printing information is not included, processing proceeds to S2-5.

(S2-4) When the over-printing information is included in the image data (or the image data includes a request for performing the over-printing process), the over-printing switching unit 224 conveys the received image data to the specified area extracting unit 225. Next, the specified area extracting unit 225 that receives the image data analyzes the image data based on the extract condition of the specified area stored in the specified area extract condition memory unit 234 (for example, to perform over-printing of a solid area of black color printing), and generates the image data only for the range for performing the over-printing within the image data. S2-5 and subsequent processing are the same as S1-5 and subsequent processing in the flow chart of FIG. 5 of the first embodiment.

Figure 8:
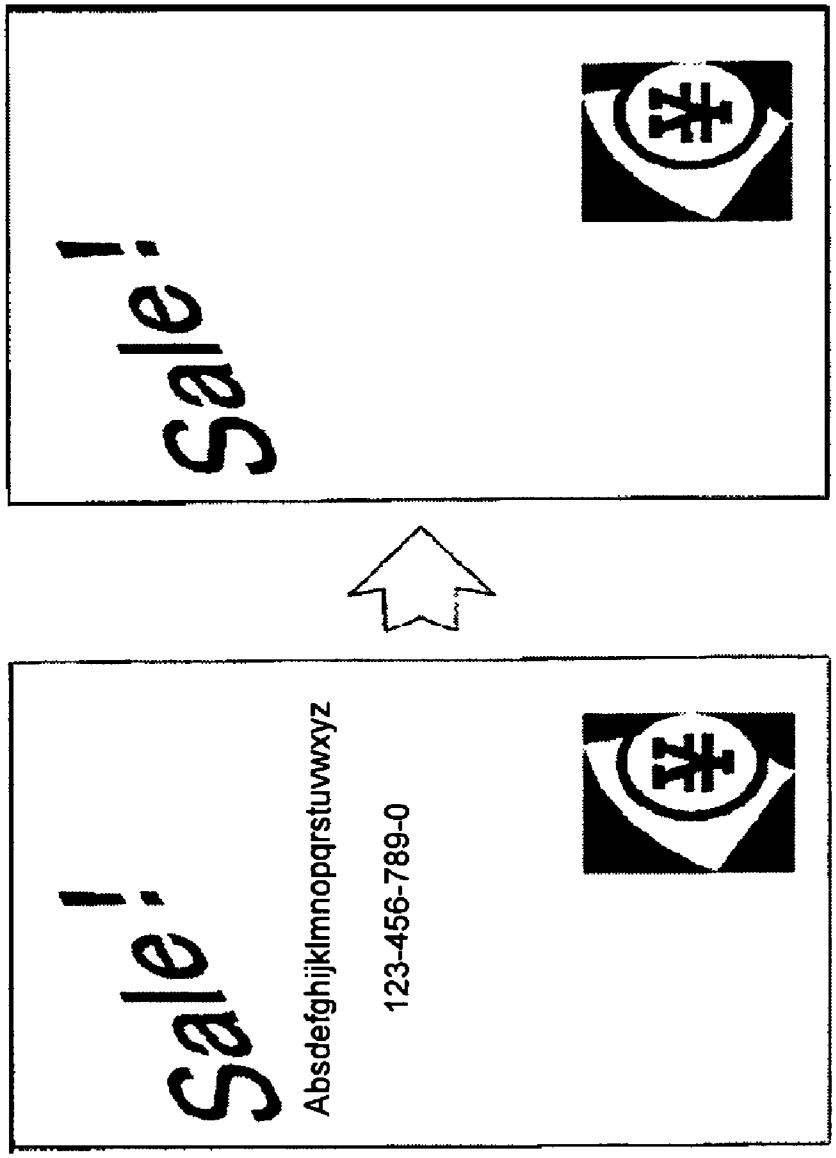
FIG. 8 is an explanatory diagram of an image formed by over-printing from an extract condition of a specified area of an image according to the second disclosed embodiment.

The extract condition of the specified area according to the second embodiment (for example, a solid area of black color printing) is next explained. FIG. 8 is an explanatory diagram of an image formed by the over-printed from the extract condition of the specified area of the image of the second embodiment.

The left side of FIG. 8 shows the entire image data of the document, and the right side of FIG. 8 shows the image of the logo parts including "Sale!" and "¥" where only the specified area is extracted. The letters "abcdefghijklmnopqrstuvwxyz" and the numbers "123-456-789-0" that are located in the center of the image data portion of the document are not solid areas; therefore these are not shown in the image of the specified area of the right side. In short, the logo parts including "Sale!" and "¥" are extracted as the solid area by extracting the specified area, and other parts are judged as non-solid areas.

Here, a definition of the solid area is explained. The image data is structured as an aggregation of single primary colors of yellow, magenta, cyan, and black that are arranged in a horizontal direction line m and a vertical direction line n, and each pixel of image data is defined by the coordinates x and y, with x for the horizontal direction and y for the vertical direction. As for the printing direction, x is the main scanning line and y is the sub scanning line.

The solid area is a condition in which the specified color pixels are entirely surrounded; in other words, a block of more than 9 pixels that is constructed with the same color pixels of 3 lines and 3 rows is considered as a solid area. However, the specified area of the present invention is only the skeleton pixels that are located inside in the condition of when the surrounding of the solid area is surrounded entirely by the same color pixels, and the surrounding edge pixels that are the same color pixels are not considered as the specified area.

Figure 9A:
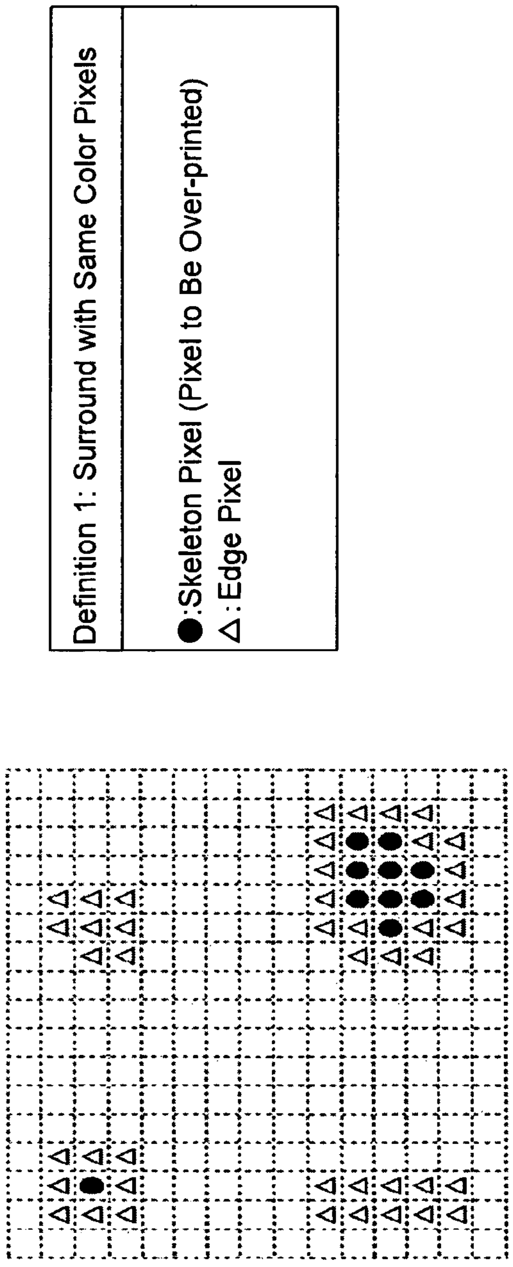
FIGS. 9A and 9B are explanatory diagrams of skeleton pixels and edge pixels showing a solid area according to the second disclosed embodiment.
Figure 9B:
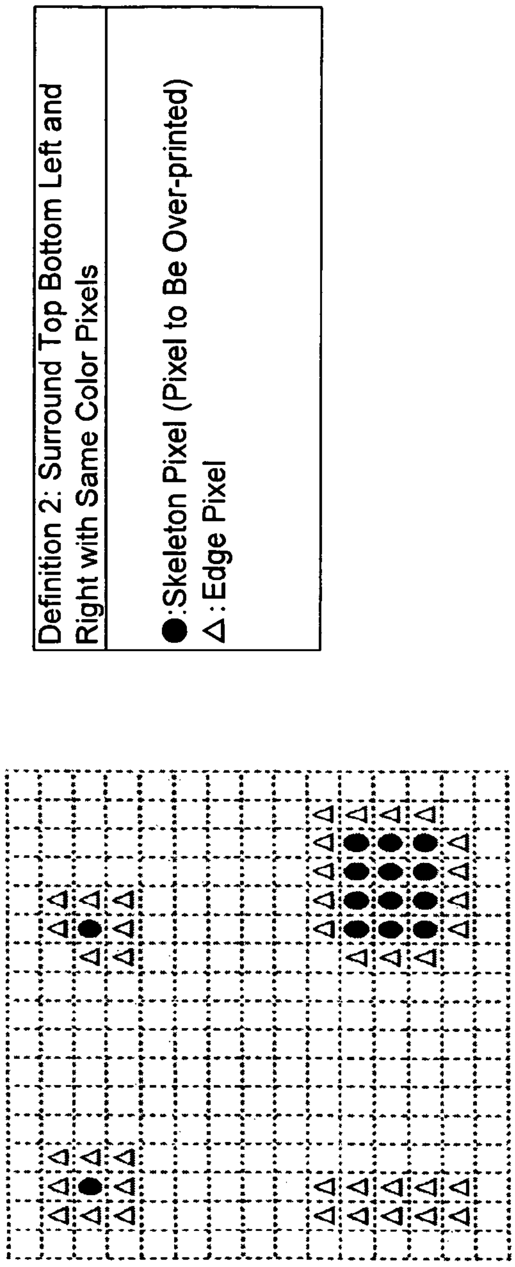

Here, the skeleton pixels and the edge pixels are explained. FIGS. 9A-9B are explanatory diagrams of the skeleton pixels and the edge pixels showing the solid area according to the second embodiment.

In FIG. 9A, according to a first definition, the pixels that are surrounded by the same color pixels are the skeleton pixels (●), and the surrounding same color pixels are edge pixels (Δ).

In FIG. 9B, according to a second definition, four sides of top, bottom, left and right of the skeleton pixels (●) are surrounded by the same color, and the surrounding same color pixels are the edge pixels (Δ). When FIGS. 9A and 9B are compared, the top right image is not the solid area according to the first definition. However, it is judged as the solid area according to the second definition. Moreover, in the case of the right bottom image, the number of skeleton pixels is different according to the first and second definitions.

Accordingly, the solid area can be defined in various ways depending on the alignment rule of the pixels. Moreover, in the present embodiment, the solid area of the black color printing is the extract condition of the specified area. However, it is also possible to define the same manner for multiple colors.

As stated above, according to the second embodiment, when the condition of the specified area for operating the over-printing is defined in advance by the user, the user does not need to designate the specified area every time the image data is transmitted, and the printer can automatically extract the specified area and perform the over-printing.

Moreover, an LED head type printer was used as an example of the image-forming device concerning the present invention, the printer including an LED as an exposure means for the image carrier. Also, a similar effect can be obtained with respect to a laser head type printer.

Moreover, as an example of the image forming device concerning the present invention, the single pass method color printer was explained. A similar effect also can be obtained for a four cycle method color printer. Furthermore, as for the image-forming device of the present invention, a similar effect can be obtained with respect to an inkjet method printer, copier or the like.

What is claimed is:

1. An image forming device comprising:

a recording medium feeding mechanism unit configured to feed a recording medium for printing, the recording medium including a front side and a back side;

a data receiving unit configured to receive image data including a high-density printing order;

a judging unit in communication with the data receiving unit and configured to judge whether or not to perform high-density printing based on the image data received from the data receiving unit;

a specified area extracting unit in communication with the judging unit and configured to extract a specified area from the image data when the judging unit judges that the high-density printing should be performed;

a printing data creating unit in communication with the specified area extracting unit and configured to create first printing data obtained from the specified area extracted by the specified area extracting unit and second printing data obtained from the image data;

a printing data memory unit in communication with the printing data creating unit and configured to store the first printing data and the second printing data created at the printing data creating unit;

an image forming unit in communication with the printing data memory unit and configured to print the stored first printing data and the stored second printing data on the front side of the recording medium; and a recording medium re-feeding mechanism unit configured to re-feed the recording medium to the image forming unit to enable the image forming unit to over-print one of the first printing data and the second printing data on the front side of the recording medium at the image forming unit, wherein at least a portion of the second printing data is repeated in the first printing data, and the high-density printing is performed by the image forming unit re-printing at least the portion of the second printing data that is repeated in the first printing data to form a high-density area with a higher density than printing data that is in the first printing data but not the second printing data.

2. The image forming device of claim 1, wherein the recording medium re-feeding mechanism unit is configured to invert the recording medium and to re-feed the recording medium to the image forming unit to print on a back side of the recording medium when the image data includes a double-sided printing order.

3. The image forming device of claim 1, wherein the specified area is a solid area where a plurality of pixels are formed adjacent to each other.

4. The image forming device of claim 1, wherein the specified area is a solid area where monochrome pixels are formed adjacent to each other.

5. The image forming device of claim 1, wherein the image forming unit is further configured to print the stored first printing data before printing the stored second printing data on the front side of the recording medium.

6. The image forming device of claim 1, further comprising a recording medium re-feeding mechanism control unit in communication with the judging unit and configured to switch the recording medium re-feeding mechanism unit to a re-feeding path position to enable re-feeding of the recording medium to the image forming unit after the image forming unit completes printing of the stored first printing data on the front side of the recording medium.

7. The image forming device of claim 2, wherein the recording medium re-feeding mechanism unit further comprises an invert carrying unit including a pair of rollers configured to invert the recording medium when the image data includes a double-sided printing order.

8. The image forming device of claim 1, wherein the recording medium re-feeding mechanism unit is configured to facilitate re-feeding the recording medium to the image forming unit and the image forming unit to re-print the one of the first printing data and the second printing data on the front side of the recording medium at the image forming unit.

9. The image forming device of claim 1, wherein the image forming unit is configured to print the stored first printing data and the stored second printing data on the front side of the recording medium by layering a second developer image, which is formed with the second printing data, on a first developer image, which is formed with the first printing data, on the front side of the recording medium.

10. An image forming system comprising:

a recording medium feeding mechanism unit configured to feed a recording medium for printing, the recording medium including a front side and a back side, a host device including a specified area designating unit configured to designate a specified area for high-density printing, a driver configured to create specified area information from the specified area of the image data that is designated by the specified designating unit, and a data transmitting unit configured to transmit the image data and the specified area information; and an image forming device including a data receiving unit configured to receive the image data, including a high-density printing order, from the data transmitting unit of the host device, a judging unit configured to judge whether or not high-density printing should be performed based on the image data and the specified area information received at the data receiving unit, a specified area extracting unit configured to extract a specified area from the image data when the judging unit judges that the high-density printing should be performed, a printing data creating unit configured to create first printing data that is obtained from the specified area extracted at the specified area extracting unit and second printing data that is obtained from the image data, a printing data memory unit for storing the first printing data and the second printing data created at the printing data creating unit, an image forming unit for printing using the first printing data and the second printing data that are stored in the printing data memory unit, and a recording medium re-feeding mechanism unit configured to re-feed the recording medium to the image forming unit for over-printing one of the first printing data and the second printing data on the front side of the recording medium, wherein at least a portion of the second printing data is repeated in the first printing data, and the high-density printing is performed by the image forming unit re-printing at least the portion of the second printing data that is repeated in the first printing data to form a high-density area with a higher density than printing data that is in the first printing data but not the second printing data.

11. The image forming system of claim 10 wherein the specified area designating unit defines designation of the specified area from a designated range of an image.

12. The image forming system of claim 10 wherein the specified area designating unit defines designation of the specified area from an attribute format of an image.

13. The image forming system of claim 10, wherein the image forming unit is further configured to print the stored first printing data before printing the stored second printing data on the front side of the recording medium.

14. The image forming system of claim 10, further comprising a recording medium re-feeding mechanism control unit in communication with the judging unit and configured to switch the recording medium re-feeding mechanism unit to a re-feeding path position to enable re-feeding of the recording medium to the image forming unit after the image forming unit completes printing of the stored first printing data on the front side of the recording medium.

15. The image forming system of claim 10, wherein the recording medium re-feeding mechanism unit is configured to invert the recording medium and to re-feed the recording medium to the image forming unit to print on a back side of the recording medium when the image data includes a double-sided printing order.

16. The image forming system of claim 15, wherein the recording medium re-feeding mechanism unit further comprises an invert carrying unit including a pair of rollers configured to invert the recording medium when the image data includes a double-sided printing order.

17. The image forming system of claim 10, wherein the image forming unit is configured to perform the printing by layering a second developer image, which is formed with the second printing data, on a first developer image, which is formed with the first printing data, on the front side of the recording medium.

18. A printer comprising:

a recording medium feeding mechanism configured to provide a recording medium for printing, the recording medium including a front side and a back side;

a controller configured to execute high-density printing if received print data includes a high-density printing order, to extract a specified area from the print data when the print data includes the high-density printing order, and to create and store first printing data obtained from the extracted specified area and second printing data obtained from the print data; and a print engine in communication with the controller and configured to print the stored first printing data and the stored second printing data on the front side of the recording medium, and to re-feed the recording medium to enable over-printing of one of the first printing data and the second printing data on the front side of the recording medium, wherein at least a portion of the second printing data is repeated in the first printing data, and the high-density printing is performed by the controller re-printing at least the portion of the second printing data that is repeated in the first printing data to form a high-density area with a higher density than printing data that is in the first printing data but not the second printing data.

19. The printer of claim 18, wherein the print engine is further configured to print the stored first printing data before printing the stored second printing data on the front side of the recording medium.

20. The printer of claim 18, wherein the print engine is further configured to invert the recording medium when the image data includes a double-sided printing order.

21. A method for forming a high-density image on a recording medium, comprising:

providing a recording medium that includes a front side and a back side;

judging whether or not to execute high-density printing based on received image data;

extracting a specified area from the image data when the judging determines that the high-density printing should be executed;

creating first printing data from the specified area extracted by the specified area extracting unit and second printing data from the image data;

storing the first printing data and the second printing data;

printing the stored first printing data and the stored second printing data on the front side of the recording medium; and re-feeding the recording medium to enable over-printing of one of the first printing data and the second printing data on the front side of the recording medium, wherein at least a portion of the second printing data is repeated in the first printing data, and the high-density printing is performed by re-printing at least the portion of the second printing data that is repeated in the first printing data to form a high-density area with a higher density than printing data that is in the first printing data but not the second printing data.

22. The method of claim 21, wherein the printing of the stored first printing data and the stored second printing data on the front side of the recording medium comprises printing the stored first printing data before printing the stored second printing data on the front side of the recording medium.

23. The method of claim 21, wherein the printing is performed by layering a second developer image, which is formed with the second printing data, on a first developer image, which is formed with the first printing data, on the front side of the recording medium.

24. The printer of claim 18, wherein the controller is configured to execute the high-density printing by layering a second developer image, which is formed with the second printing data, on a first developer image, which is formed with the first printing data, on the front side of the recording medium.

* * * * *